United States Patent [19]

Williams

[11] Patent Number: 4,611,776

[45] Date of Patent: Sep. 16, 1986

[54] ROLLER CLAMP FOR ENGINE TEST STAND

[76] Inventor: William J. Williams, 2731 Pawnee Dr., Indianapolis, Ind. 46229

[21] Appl. No.: 480,266

[22] Filed: Mar. 30, 1983

[51] Int. Cl.⁴ .............................................. A47B 96/06
[52] U.S. Cl. ..................................... 248/228; 248/646
[58] Field of Search ................... 248/72, 226.1, 226.2, 248/228, 646, 647, 658, 657, 676

[56] References Cited

U.S. PATENT DOCUMENTS

| | | | |
|---|---|---|---|
| 470,102 | 3/1892 | Canby | 248/72 |
| 1,474,059 | 7/1922 | Voellmecke | 248/72 |
| 1,840,216 | 1/1932 | Tormo | 248/72 |
| 1,877,781 | 9/1932 | Akerlund | 248/72 |
| 2,925,240 | 2/1960 | Laviolette | 248/228 X |
| 3,301,513 | 1/1967 | Sugaya | 248/72 |

Primary Examiner—Ramon O. Ramirez
Attorney, Agent, or Firm—Woodard, Weikart, Emhardt & Naughton

[57] ABSTRACT

A roller assembly for mounting carriages to rails is provided with a clamp having a pair of jaws securable to the rail by a handwheel. The length of bearing of the jaws on the rail is relatively small so that, upon loading a clamped assembly in a direction tending to move it along the rail, the clamp will rotate into tighter biting engagement with the rail to prevent slippage thereon. Release is achieved, even after the biting action, by positive separation of the jaws in response to loosening rotation of the handwheel with screw thread action driving the jaws apart from each other and from the rail.

9 Claims, 10 Drawing Figures

ROLLER CLAMP FOR ENGINE TEST STAND

BACKGROUND OF THE INVENTION

1. Field of the Invention

This invention relates generally to engine test stands, and more particularly to clamps on carriage support rollers.

2. Description of the Prior Art

There is a standard rail system that has been adopted and used in the aircraft industry for the mounting of aircraft jet engines for handling, maintenance, test and general dealing with such engines. This rail system includes a pair of I-section rails which are horizontally spaced. Carriages are mounted to these rails. The carriages are mounted by the use of roller adapters. These adapters make it easy to mount the carriage, regardless of its configuration. The rollers roll on the rails but can be easily clamped to the rails at any desired location. Val Industries, Inc., the assignee of the present application, has manufactured roller adapters for the above purposes for many years.

The advantage of the roller adapters manufactured by Val has been the fact that they could be securely clamped to the rails by the use of hand operated knobs, and did not need to have wrenches applied to the clamps to do the job. Nevertheless it has been found that certain engines, while under test, develop so much thrust that movement of the adaptors along the rails may occur, even though the clamps remain tight. It was discovered that the reason for this, was a type of failure of the rail. The clamps could actually shear metal from the underside of the rail flange to which they were secured, and thereby enable themselves to slide along the rail. The present invention is addressed to solving this problem.

SUMMARY OF THE INVENTION

Described briefly, according to a typical embodiment of the invention, a roller assembly has a housing with two rollers in tandem, and clamp jaws between them. The jaws are mounted on a bolt whose axis is parallel to the axes of the rollers, and between the rollers. The jaws have teeth on them to grip the underside of a rail on which the rollers are mounted and on which the rollers can roll when it is desired to move the carriage along the rail. One configuration of teeth is a series of serrations oriented in a direction transverse to the direction of the rail. The area where the serrations are located extends only a short distance in the direction of the rail, the distance being less than the radius from the center of the clamp bolt axis to the point on the teeth closest to the clamp bolt.

DESCRIPTION OF THE PREFERRED EMBODIMENT

Figures 1, 2, 3, 4, 5, 6:
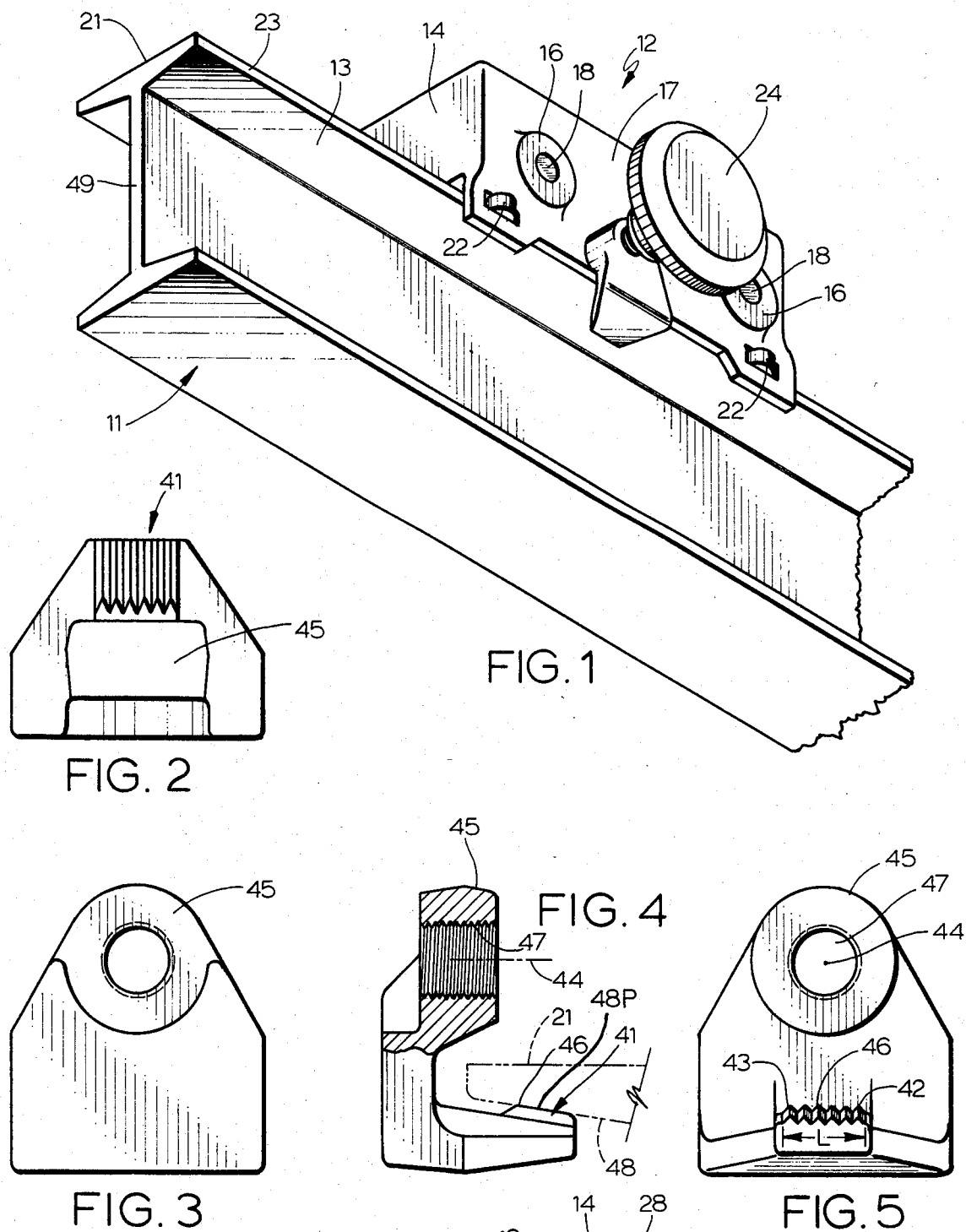
FIG. 1 is a pictorial view of a portion of an engine transport mounting rail having a roller adapter thereon with clamp according to a typical embodiment of the present invention.
FIG. 2 is a top plan view of a clamp according to a typical embodiment of the present invention.
FIG. 3 is an outside elevational view thereof.
FIG. 4 is a front elevational view thereof with a portion broken away to show the threaded aperture therein.
FIG. 5 is an inside elevational view thereof.
FIG. 6 is a section through a roller adapter assembly incorporating two clamps according to a typical embodiment of the present invention.

Referring now to the drawings in detail, and particularly FIG. 1, the rail 11, shown fragmentarily, has a roller adapter 12 received on the upper flange 13 thereof. The roller adapter includes a housing 14 having a pair of bosses 16 on each side of wall 17 (see FIG. 6 also). Each of the bosses has a bushing therein receiving an axle 18 attached to a support roller 19 (FIG. 6). Each of these rollers is situated to rest and roll on the top 21 of the top flange of the rail. Since there are the two rollers in tandem, and since the housings 14 have threaded apertures (not shown) in the tops thereof to receive mounting bolts for carriages, to adapt the carriages to support on the rails, they are referred to as double roller adapters.

In addition to the support rollers, there are two side rollers such as 22 mounted in the housing on each side thereof and engagable with the side edge such as 23 of the top flange. Thus, there are four of these side rollers, two of them being shown in FIG. 1. In this way, the roller adapter is capable of rolling along the flange and being guided by the four side rollers as it rolls along.

Four or more such roller adapters are used with inverted U-shaped hangers or other types of carriage structure spanning the space between a pair of rails like rail 11, to support an engine. When it is desired to prevent the rollers from rolling, so as to secure the engine in place for servicing, testing or other purposes, the roller adapter can be secured by turning the hand knob 24. This knob may be knurled or may have nubs on it, as desired to facilitate handling and tightening. This knob is pinned to the end of a bolt 26 supported in an aperture 27 in the dropped center portion 28 of the housing. Normally a bushing (not shown) is provided between the bolt and the housing to facilitate rotation of the bolt in the housing.

Two clamps 29 are received on the bolt, each of them being threaded onto the bolt. The threads 31 and 32 are of opposite hand, i.e. left-hand and right-hand, like those in a turnbuckle. Therefore, upon turning the knob 24 in one rotational direction, both clamps are pulled toward each other. Upon turning the knob in the opposite rotational direction, the clamps are driven apart.

Figure 7:
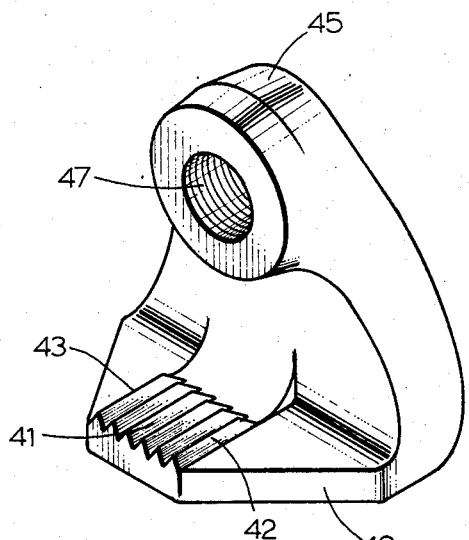
FIG. 7 is a pictorial view on enlarged scale of the clamp itself.
Figure 8:
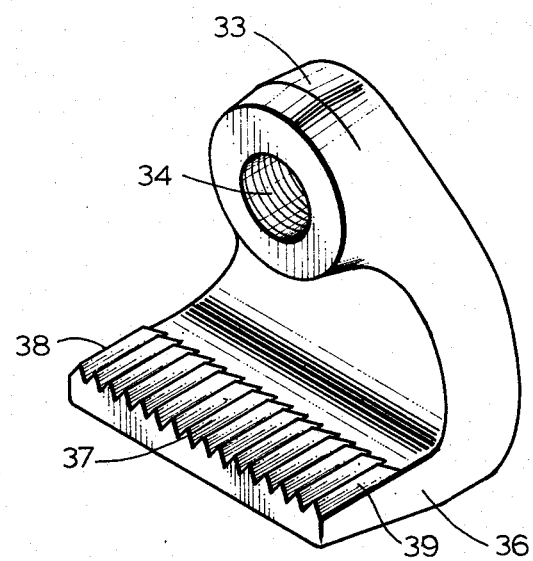
FIG. 8 is an enlarged view of a prior art clamp.
Figure 9:
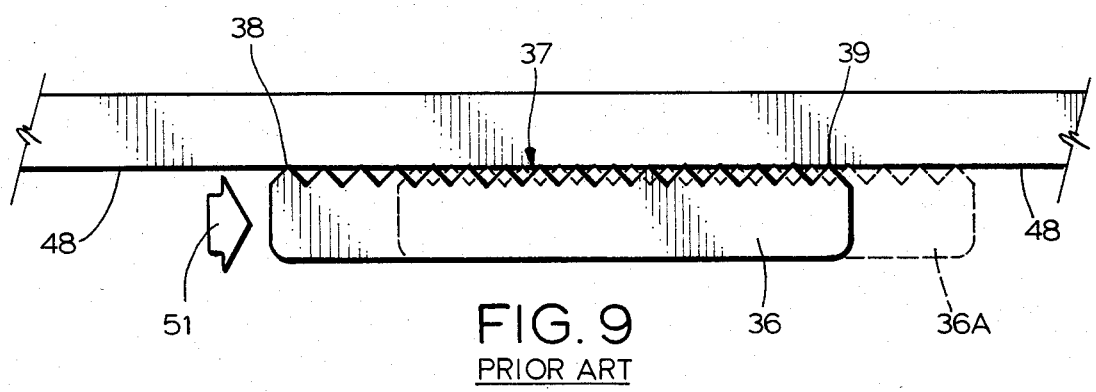
FIG. 9 is a further enlarged side diagrammatic view of a portion of rail and prior art clamp.
Figure 10:
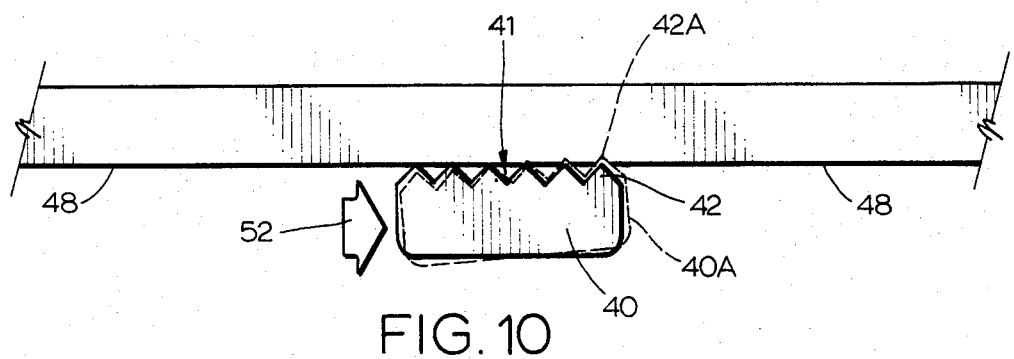
FIG. 10 is a view like FIG. 9 but showing the present invention.

The structure described thus far is prior art except for the specific nature of the clamp jaws themselves. In that regard, comparison of FIG. 8 with FIG. 7 shows most dramatically, the difference between the prior art clamp jaw and the clamp jaw of the present invention shown in FIG. 7. FIG. 9 also shows the prior art clamp jaw which can be compared to the clamp jaw of the present invention shown in FIG. 10. In that connection, both jaws include a body with a mounting portion such as 33 in FIG. 8, and 45 in FIG. 7 having the internal threads 34, 47 receivable on a clamp bolt. Both have a generally C-shaped portion with a lower arm portion 36 (FIG. 7) or 40 (FIG. 8) having upwardly projecting saw-tooth serrations. The major difference is the fact that the saw-tooth serrations in the prior art clamp jaw as shown at 37 extend in series for a substantial distance from the end 38 to the end 39. In contrast, the serrations 41 in the clamp jaw of the present invention are in a series which is very short in length extending from the first 42 to the last 43. In fact, as is best shown in FIG. 5, the distance from one end serration 42 to the last serration 43 is less than the radius from the center 44 of the threaded aperture of the mountng portion to the crest 46 of the tooth nearest the bolt hole 47.

As shown in FIG. 4, the crests or tops of the teeth 41 lie in a plane 48P which is parallel to the length of the rail but slopes downward toward the web 49 of the rail. This is also shown in FIG. 6. However, this slope is not a feature of the present invention, as it was included in the prior art clamp jaw. It enables the teeth of the clamp jaws to rather completely engage along the underside of the flange along the entire length of each of the teeth. As shown in FIG. 9, where there is a relatively large number of serrations, the teeth engage a fairly large area of the underside of the flange. The result is the fact that, when the jaws are clamped by tightening the knob 24, and an excessive load is supplied such as in the direction of arrow 51, the clamp jaw may slide longitudinally of the rail such as to the position shown by the dotted line 36A. In doing so, the teeth may peel material from the lower face 48 of the flange and, as they do so, the trailing teeth from the leading tooth 39 back to the tooth 38 can move relatively freely along the rail. In contrast, as shown for the present invention in FIG. 10, with the relatively short length of the extension of the series of teeth 41 in the direction of arrow 52, this being the direction of the length of the rail, fewer teeth bite into a smaller area of the rail. Accordingly, when the load on the clamp jaw tending to move it in the direction of arrow 52 increases, such as described above with reference to FIG. 9, the jaw will not slide but, instead, will tend to rotate about axis 44. Then the front tooth 42, rather than peeling the bottom 48 of the flange, will dig further into it as shown by the dotted line 42A, and get increasingly tight as the load increases or the jaw is displaced very slightly as shown by the dotted line 40A in FIG. 10. Consequently, the roller adapter and the carriage mounted to it cannot slide along the rail.

As mentioned above, it is highly preferred that the length of the series of serrations from the leading tooth to the trailing tooth in the direction of the rail (this being a direction transverse to the roller and bolt axes and in a plane parallel to the plane of the bottoms of the support rollers where they engage and are supported on the top flange of the rail) be relatively short and preferably no greater than 75% of the distance from the nearest of the teeth to the bolt. Both clamp jaws on the bolt are the same.

The typical shape of the serrations is saw-tooth with an included angle of from 85° to 95° and a tooth depth from the crest to the root of 0.04 to 0.06 inches. The material is preferably SAE 6150 steel with a black oxide finish and hardened to 40–45 on the Rockwell C scale. The bolt threads are typically ⅜-18 UNF-2B, one being left-hand thread and the other being right-hand thread. The overall distance (dimension L in FIG. 5) from the outside of the first tooth 42 to the outside of the last tooth 43 is nominally 0.750 inches.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A roller clamp assembly comprising:
a housing having two rollers thereon having parallel rotational axes and arranged in tandem;
a pair of clamp jaws located between said rollers;
a jaw mounting bolt mounted in said housing and having a longitudinal axis parallel to said rotational axes and located between said rollers,
said jaws being threaded onto portions of said bolt, said jaws having teeth on upper faces thereof to grip the underside of a rail on which the rollers are to run, said teeth being oriented in a direction parallel to said rotational axes, the area covered by said teeth on a jaw extending only a short distance in a direction perpendicular to said axes, said distance being no greater than seventy five percent of the radius from the bolt axis to the point on the teeth closest to the bolt axis.

2. The assembly of claim 1 wherein:
said teeth are serrations having edges extending parallel to the bolt axis.

3. The assembly of claim 2 wherein:
said teeth project upwardly.

4. The assembly of claim 1 wherein:
said rotational axes are in a first plane;
the bottoms of said rollers are tangent to a second plane parallel to said first plane; and
the tops of said teeth are below said second plane.

5. The assembly of claim 4 wherein:
said teeth are arranged in a series of serrations which extend parallel to the axis of said bolt, the series extending in a direction parallel to said planes and perpendicular to the said axes;
the tops of said teeth of one jaw lie in a plane and slope downward as they extend inward toward the other jaw.

6. The assembly of claim 4 wherein:
the teeth are in an area substantially centered on the vertical downward projection of the bolt axis.

7. The assembly of claim 5 and further comprising:
a rail having a horizontal top flange and vertical web means extending downward from the longitudinal center of the flange,
said rollers being supported on and able to roll along the top of the rail,
said jaws having said teeth engaging the bottom of the flange on opposite sides of said web means,
said bolt having a hand-knob at the end thereof, and said bolt having threads receiving the jaws thereon, there being two threads having opposite thread directions, with one jaw received on one of said threads and the other jaw received on the other of said threads such that, when the knob is turned in one rotational direction, the jaws are pulled toward each other and tightened onto the rail and, when the knob is turned in the opposite rotational direction, the jaws are pushed apart and released from the rail.

8. The assembly of claim 7 wherein:
said direction perpendicular to the axis is the direction of the length of the rail.

9. The jaw of claim 1 wherein:
the material of said jaw is hardened to between 40 and 45 Rockwell C; and
there are six substantially equally-spaced serrations of substantially sawtooth configuration with teeth between 0.04 and 0.06 inches deep and having included angles of 85 to 90 degrees.

* * * * *